United States Patent [19]
Adsett

[11] Patent Number: 5,317,579
[45] Date of Patent: May 31, 1994

[54] LASER PUMP

[75] Inventor: Anthony P. Adsett, Orlando, Fla.

[73] Assignee: Litton Systems, Inc., Beverly Hills, Calif.

[21] Appl. No.: 925,658

[22] Filed: Aug. 7, 1992

[51] Int. Cl.$^5$ .............................................. H01S 3/04
[52] U.S. Cl. ...................................... 372/35; 372/69; 372/37; 372/98; 372/92; 417/372
[58] Field of Search .................... 372/35, 37, 59, 58, 372/92, 55; 417/372

[56] References Cited

U.S. PATENT DOCUMENTS

| | | | |
|---|---|---|---|
| 4,500,998 | 2/1985 | Kuwabara et al. | 372/58 |
| 5,060,238 | 10/1991 | Karube et al. | 372/59 |
| 5,124,997 | 6/1992 | Funakubo et al. | 372/59 |
| 5,149,253 | 9/1992 | Miyamoto et al. | 417/372 |
| 5,177,762 | 1/1993 | Sato et al. | 372/37 |
| 5,206,873 | 4/1993 | Funakubo et al. | 373/59 |

*Primary Examiner*—Léon Scott, Jr.
*Attorney, Agent, or Firm*—William M. Hobby, III

[57] ABSTRACT

A method and apparatus for pumping a coolant through a laser cavity to cool the laser. The apparatus has a titanium housing and a casing containing a rotatable titanium hollow shaft. A titanium impeller is located at one end of the shaft within the housing and rotates with the shaft to pump the fluid through a laser. Disposed within casing and attached to the shaft are a plurality of permanent magnets. External to the casing are stator windings through which current flows to create a magnetic field that rotates the permanent magnets, shaft and impeller. When the impeller is rotated, the coolant is passed through the housing and to the laser. The impeller also forces the fluid passing through the shaft and into the casing to cool and lubricate the pump. The magnets are encased in a titanium sleeve attached to the titanium shaft to prevent the coolant from contacting with the magnets.

19 Claims, 3 Drawing Sheets

LASER PUMP

BACKGROUND OF THE INVENTION

This invention relates to devices for pumping coolants and more particularly to a device for pumping fluids or gasses under pressure through a laser cavity.

High powered lasers typically have powerful flash lamps which become hot after extended use. To alleviate this heating problem, lasers have a conduit through which a fluid or a pressurized gas is pumped to a heat exchanger where the coolant is cooled before being pumped back through the laser.

The present invention is for a laser coolant pump having an armature and a plurality of permanent magnets on a rotor shaft. Current flows through the armature setting up a magnetic field to turn the rotor. The rotor shaft has an impeller mounted thereto which turns to push the coolant through the pump, the heat exchanger and the laser. Bearings are mounted in the pump housing to support the rotor shaft while allowing it to rotate.

As the rotor rotates, friction causes a heat buildup between the rotor and the bearings. When current is passed through the stator, the stator also becomes hot and must be cooled. One way to cool the stator and bearing is to pass coolant or lasing material through the pump. However, the coolant may be at high temperatures when passing through the pump. As the coolant passes through the pump at these high temperatures, the material along the walls of the pump and the bearing may corrode and contaminate the coolant. When a contaminated coolant enters the laser cavity, the efficiency of the laser is reduced.

Another drawback to prior laser pumps is that the electrical motor armature must be placed adjacent the stator. This positioning is critical so that when current is passed through the stator, the armature magnetically communicates with the stator to cause it to rotate. However this placement requires that permanent magnets be placed adjacent the stator. Consequently when the coolant passes through the pump motor, it contacts the magnets which can result in contamination of the coolant by the magnets.

Many existing magnetically coupled pumps use a shaft with an impeller which encapsulates a magnet. These pumps include a heavy cantilevered drive magnet assembly with a high mass overhang moment. Consequently, the rotor can experience high moment loads under vibration. High moment loads can reduce the reliability of the pump.

Laser pumps with shafts typically include sleeve and shaft bearings. These bearings permit rotation of the shaft. However, with extended pump usage, those bearings wear out and require replacement.

SUMMARY OF THE INVENTION

An object of this invention is to provide an improved apparatus for pumping coolant or lasing material through a laser cavity.

Another object of this invention is to use a pump to push coolant through a laser cavity without the pump contaminating the coolant.

It is also an object of this invention to inject coolant into a laser cavity with a pump that uses the coolant to cool and lubricate itself.

An additional object of this invention is to move coolant with a pump that has a rotor having a plurality of permanent magnets, each encased in a sleeve to prevent the magnets from contaminating the coolant.

A further object of the invention is to construct a coolant pump such that the only surface of the pump that the coolant contacts is constructed of a noncorrosive material.

It is another object of the invention to construct a pump of titanium for pushing fluid through a laser cavity.

An additional object is to construct a laser pump which has a shaft with an impeller such that the pumps rotor moment load is negligible at high speeds.

Also an object of this invention is to provide a method for pumping coolant under high temperature and pressure without the pump contaminating the coolant.

These and other object are provided with an apparatus for pumping a coolant or lasing material in a laser apparatus. The apparatus includes a titanium casing having an inlet and an outlet through which the coolant flows. A titanium housing is coupled to the casing and has a cavity. An impeller is disposed in the housing which is operative for moving the coolant through the inlet, the casing and out the outlet. A titanium shaft is coupled at one end to the impeller and extends through the casing and the cavity. A plurality of permanent magnets are coupled to the rotor shaft within the cavity. The magnets are encased in titanium sleeves to prevent contamination of the coolant. A source of electric current is electrically coupled to the stator windings. The stator windings are external to the cavity and induce a magnet field within the cavity in response to the electric current to rotate the permanent magnets, the shaft and the impeller such that when the impeller is rotated, the coolant is moved through the inlet into the casing and out the outlet. Thus, a fluid passing through the pump has contact only with titanium surfaces which do not contaminate the fluid even under adverse conditions of temperature and corrosive fluids.

In another aspect of the invention, a method of pumping a coolant to cool a laser is provided. The method comprises the steps of providing a pump having a housing connected to a casing and extending a rotatable titanium shaft through the casing and into the housing. An impeller is attached to one end of the shaft within the housing. A plurality of permanent magnets are attached to the titanium shaft within the casing and each permanent magnet is completely encased in a titanium sleeve. A plurality of stator windings are provided which are positioned external of the titanium casing and in magnetic communication with the permanent magnets. A varying electrical voltage is applied to the stator windings to create a magnetic field across the permanent magnets to rotate the rotor, shaft, and the impeller. A laser is connected with a conduit to the pump casing and housing where the coolant is pumped by the impeller. The coolant flows through the titanium casing to cool and lubricate the pump without direct contact with the permanent magnets.

DESCRIPTION OF THE PREFERRED EMBODIMENTS

Figure 1:
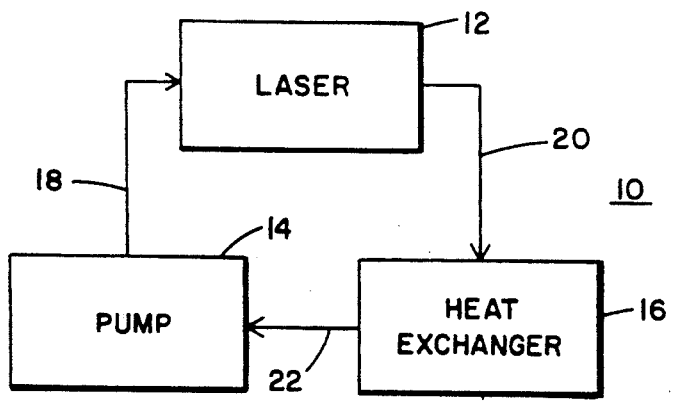
FIG. 1 is a block diagram of a laser system having a laser, a pump and a heat exchanger.

Referring to FIG. 1 there is shown a laser system 10 having a laser 12 thermally coupled to a pump 14 and to a heat exchanger 16 with conduits 18 and 20. A conduit 22 connects the heat exchanger 14 to pump 12. Laser 12 and heat exchanger 16 are constructed using conventional techniques and may be a gas or solid state laser as desired. Laser 12 has a conduit through which coolant flows to cool the laser 12.

During operation, the pump 14 forces coolant from the heat exchanger 16 into the cavity within laser 12. Coolant is circulated through the laser 12 where it is heated to a high temperature and through the heat exchanger 16 to cool the coolant. The lasing method may be a gas under high pressure (1000 psi), however, any conventional fluid coolant or lasing method can be pumped by the present pump.

Figure 2:
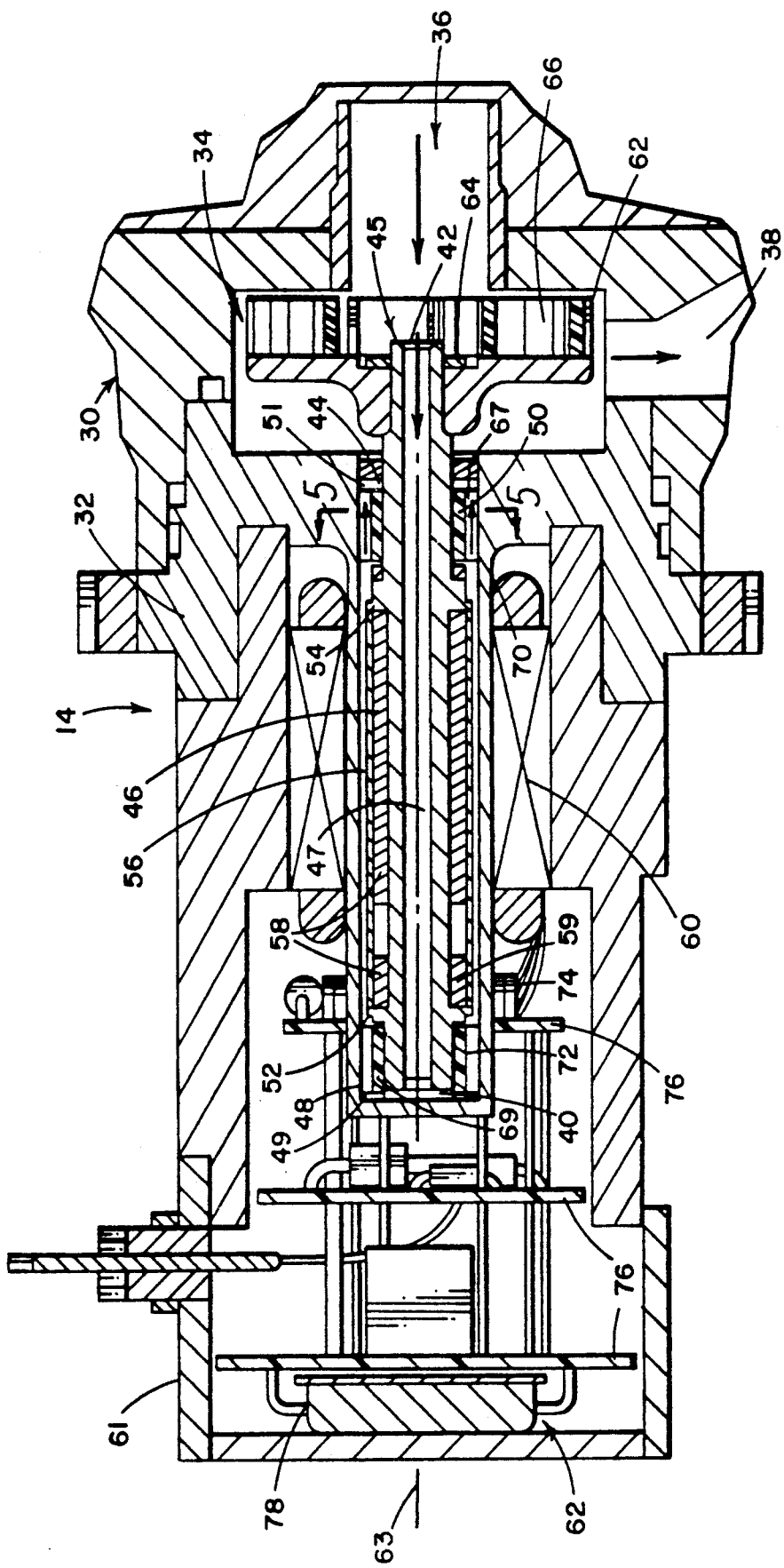
FIG. 2 is a sectional view taken along an elongated axis of a preferred embodiment of the pump in accordance with the present invention.

Referring to FIG. 2, pump 14 is shown having a titanium housing 30 physically connected to a titanium casing 32. Housing 30 has a cavity 34 with an inlet 36 through which coolant flows into housing 30, and an outlet 38 through which coolant exits housing 30. Casing 32 also has a cavity 40.

A rotor 45 having a hollow titanium shaft 46 extends through cavity 40 in casing 32 and into housing 30. The titanium shaft 46 is secured to casing 32 with DELRIN AF bushings 48 and 50 located at opposite ends of cavity 40 within casing 32. Shaft 46 has a conduit 47 extending longitudinally therethrough. Conduit 47 has an inlet 42 through which coolant flows into cavity 40 to cool and lubricate pump 14. Fluid exits cavity 47 through outlet 44. Flanges 52 and 54 extend outwardly away from shaft 46 adjacent annular bushings 48 and 50 respectively. Bushing 48 is secured between a flange 49 of casing 32 and flange 52. Bushing 50 is secured with snap ring 51, between ring 51 and flange 54. A plurality of permanent magnets 58, such as samarium cobalt magnets, are attached with epoxy around the outside parameter of shaft 46 between flanges 52 and 54. Position magnets 59, in one embodiment, are also attached to shaft 46. On the outer edges of flanges 52 and 54 is a sleeve 56 which encases magnets 58 and 59.

Figure 3:
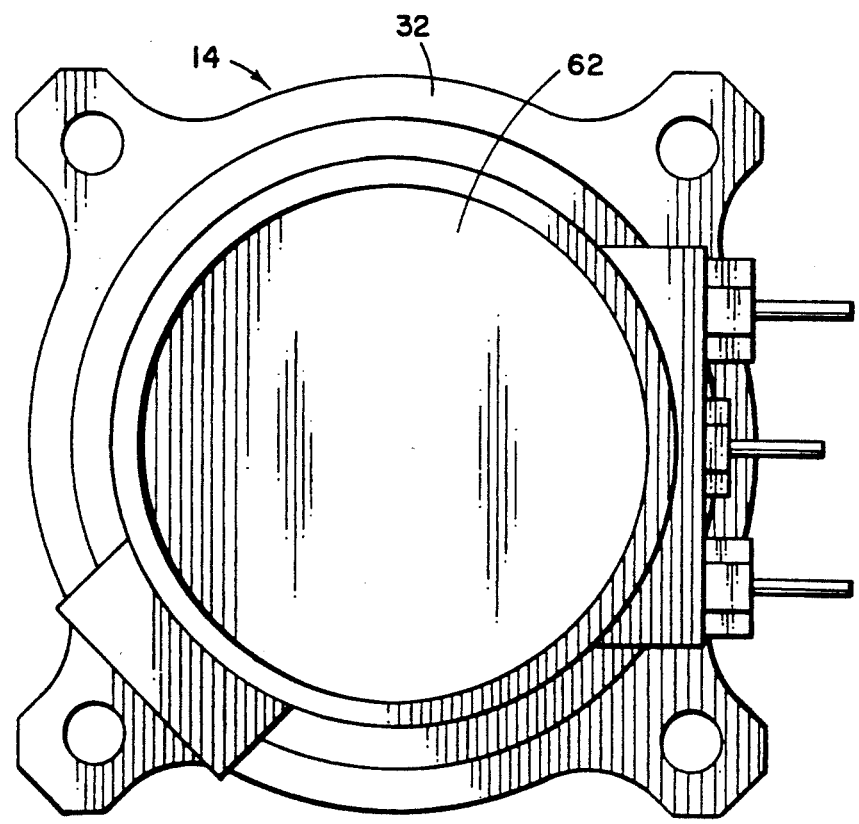
FIG. 3 is an end elevation of the pump of FIG. 2.

Stator windings 60, also referred to as a coil, extend around the exterior of cavity 40 within casing 32 in a manner that induces a magnetic field within cavity 40 when current is passed through windings 60. Windings 60 are coupled to an electric circuit 62 (See FIGS. 2 and 3), encased in pump 14 and electrically connected to a power source (not shown). Electric circuit by conventional means transforms power (preferably direct current) from the source into a plurality of direct current pulses. These DC pulses are transferred to stator 60 to turn shaft 46. A conventional hall effect sensor 74 may be positioned in the cavity adjacent the stator windings 60 opposing magnets 59. Sensor 74 detects magnets 59 to sense the rotational position of shaft 46.

Electronic circuit 62 includes a plurality of circuit bands 76. Circuit 62 has a cover 78 that is thermally connected to a cap 61 on one end of pump 14. Cap 61 transfers heat to casing 32 to dissipate heat generated by electronic circuit 62. Heat generated by stator 60 is also transferred to casing 32.

An axis 63 extends longitudinally through shaft 46. Power source 62 induces windings 60 to generate a magnetic field that causes permanent magnets 58 and shaft 46 to rotate about axis 63.

Figure 4:
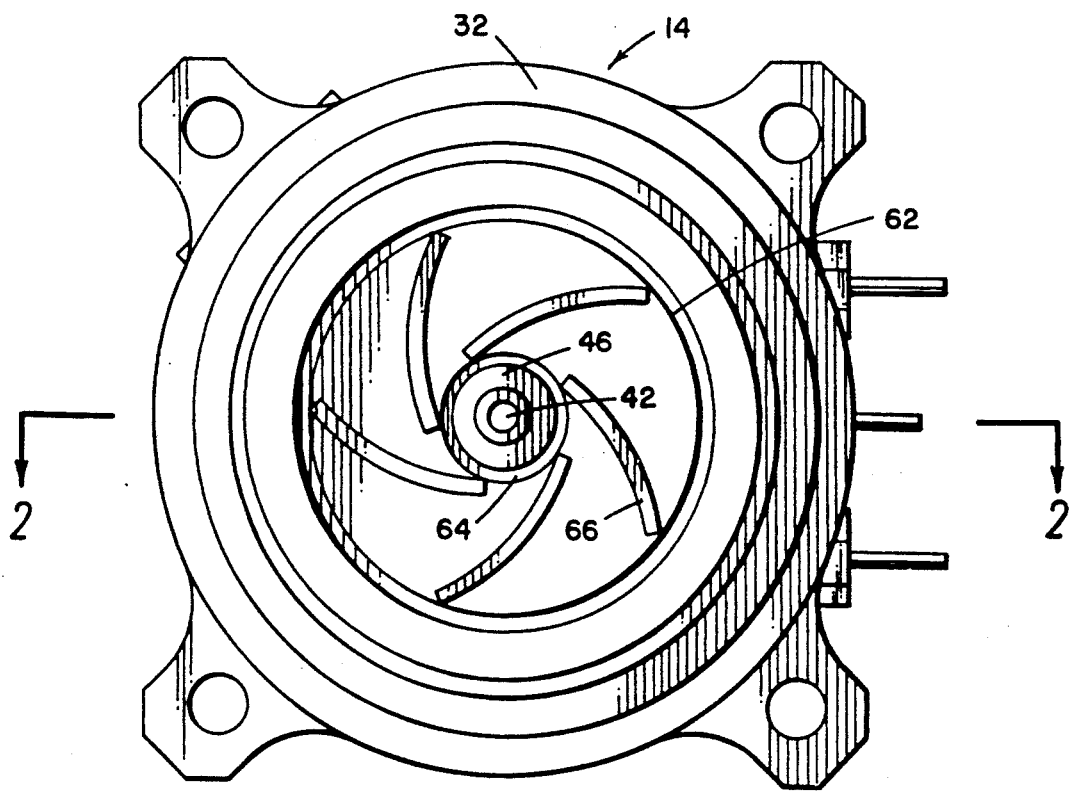
FIG. 4 is a sectional view showing the pump impeller.

Referring to FIGS. 2 and 4, impeller 62 is disposed at the end of shaft within housing 30. The impeller 62 is held on shaft 46 with snap ring 64. Impeller 62 has a plurality of blades 66 that rotate about axis 60 and draw a coolant fluid in through inlet 36 and out outlet 38 to pump the fluid through laser 12 and heat exchanger 16. When rotating, impeller 62 forces fluid radially outward from axis 63 to create a venturi effect. This venturi effect creates a negative pressure between impeller 66 and outlet 50 to draw fluid in inlet 42 and out outlet 38.

Figure 5:
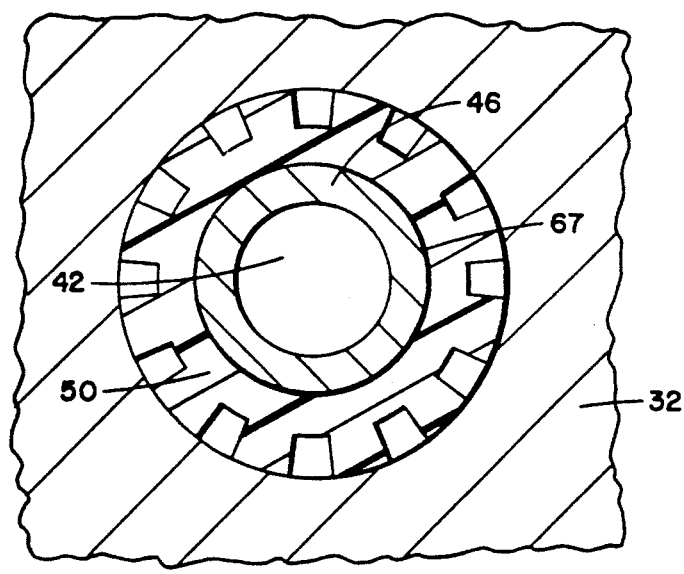
FIG. 5 is a sectional view along line 5—5 of FIG. 2.

Referring to FIGS. 2 and 5, bushings 50 and 48 have a plurality of outwardly radiating teeth 67 and 69 around their parameter, 70 and 72, through which coolant flows when exiting cavity 40. Coolant passing through cavity 40 to cool casing 32 and pump 14. In addition to cooling pump 14, coolant lubricates contacts between shaft 46 and bushings 48, and the contacts between shaft 46 and bushing 50. By passing fluid over these contacts a hydrodynamic bearing is created that effectively eliminates wear on the contact between bushing 50 and 48 and shaft 46.

Shaft 46, impeller 62, casing 32 and sleeve 56 are constructed with titanium so that the fluid passing through the pump only contacts a titanium surface or DELRIN AF. Titanium has been found to be especially corrosion resistant to laser coolant fluids and lasing materials and prevents coolant passing through pump 14 from becoming contaminated. By using a permanent magnet motor with sleeves and a brushless rotor eliminates any contact with any pump parts other than titanium. Titanium also has the advantage that it does not interfere with the magnetic fields generated by the stator windings and thus allows the windings to be located outside the pump housing while the permanent magnets are located inside the housing.

A reading by those skilled in the art will bring to mind various changes without departing from the spirit and scope of the invention. It is intended, however, that the invention only be limited by the following appended claims.

What is claimed is:

1. An apparatus for pumping a liquid coolant comprising:

a casing having a cavity therein and a casing inlet and a casing outlet for the flow of liquid coolant into and from said casing cavity;

a housing attached to one end of said casing, said housing having a cavity therein;

an impeller rotatably mounted inside said housing cavity and operative for moving a liquid coolant through said casing inlet, through said casing cavity and out said casing outlet;

a shaft extending axially through said casing cavity and into said housing cavity and having said impeller coupled to one end thereof;

a permanent magnet attached to said shaft within said casing cavity, said magnet being encased in titanium, whereby said magnet is isolated from the liquid coolant passing through said casing cavity to prevent corrosion thereof and contamination of said liquid coolant;

a source of electric current; and an electrical winding electrically coupled to said source of electric current, said electrical winding being located adjacent said casing and external to said casing cavity for inducing a magnetic field within said casing cavity in response to electric current passing through said electrical winding to thereby rotate said shaft having said permanent magnet and impeller attached thereto, whereby said impeller moves said coolant through said casing inlet into said casing cavity and out said casing outlet to thereby cool said casing and electrical winding.

2. The apparatus as recited in claim 1 wherein said shaft and said housing are constructed of titanium.

3. The apparatus as recited in claim 1 wherein said housing is connected to said casing such that when said impeller rotates therein, a portion of the coolant passes through said casing cavity.

4. The apparatus as recited in claim 1 further comprising a first and second annular bushing are connected to said casing for supporting said shaft within the casing cavity, said first bushing supporting one end thereof and said second bushing supporting the shaft adjacent the other end of the shaft.

5. The apparatus as recited in claim 4 wherein coolant flows into said housing when said impeller is rotated and wherein said first bushing has a plurality of teeth radiating outwardly along a perimeter thereof for the coolant to flow thereby.

6. The apparatus as recited in claim 1 wherein said shaft has a conduit extending therethrough wherein said fluid flows into said cavity through said conduit when said impeller is rotated such that said coolant passing through said cavity thermally communicates with said housing to cool said pump.

7. The apparatus as recited in claim 6 further comprising a titanium sleeve surrounds said magnet and is attached to said shaft to prevent coolant in said casing cavity from contacting said magnet.

8. The apparatus as recited in claim 1 in which a plurality of magnets are attached to said shaft and each of said magnets are covered with a titanium sleeve attached to said shaft.

9. A laser system comprising:
 a laser for generating coherent light energy and having a conduit through which a liquid coolant flows to cool said laser;
 a heat exchanger coupled to said laser for cooling the liquid coolant after flowing through said laser;
 a pump coupled to said laser and to said heat exchanger, said pump being operative to move liquid coolant through said laser conduit in said laser and through said heat exchanger, said laser pump including:
  (a) a casing having a cavity therein and a casing inlet for the flow of a liquid coolant into said casing cavity and a casing outlet for the flow of a liquid coolant from said cavity;
  (b) a housing attached to one end of said casing and having a housing cavity therein;
  (c) an impeller rotatably mounted in said housing cavity and operative for moving said liquid coolant through said casing inlet, into said casing cavity and out said casing outlet;
  (d) a shaft extending axially through said casing cavity and into said housing cavity and having said impeller coupled to one end of said shaft;
  (e) at least one permanent magnet attached to said shaft within said casing cavity, said magnet being encased in titanium, whereby said magnet is isolated from the liquid coolant to prevent corrosion of said magnet and contamination of said liquid coolant;
  (f) a source of electric current; and
  (g) a stator winding electrically coupled to said source of electric current and attached external to said casing cavity, said stator winding inducing a magnetic filed within said casing cavity in response to the electric current passing through said stator winding to rotate said permanent magnet, said shaft and said impeller, such that when said impeller is rotated the liquid coolant is moved through said casing inlet into said casing cavity and out said casing outlet, whereby a laser coolant pump cools said pump casing and stator winding.

10. The laser system as recited in claim 9 wherein said shaft and said housing are constructed of titanium.

11. The laser system as recited in claim 9 wherein said housing is connected to said casing such that when said impeller rotates in said housing, a portion of the coolant passes through said casing cavity.

12. The laser system as recited in claim 9 further comprising a first and second annular bushing connected to said casing for supporting said shaft within said casing cavity, said first and second annular bushings each having a plurality of teeth radiating outwardly from the perimeter thereof and said first bushing supporting one end of said shaft and said second bushing supporting the other end of said shaft.

13. The laser system as recited in claim 12 wherein said shaft has a conduit extending therethrough, wherein said coolant flows through said conduit into said casing cavity when said impeller is rotated.

14. The laser system as recited in claim 13 wherein said coolant flows into said casing cavity when said impeller is rotated such that said coolant passing through said housing cavity thermally communicates with said housing to cool said pump and wherein coolant also flows between said first and second bushings and shaft to create a hydrodynamic bearing surface to thereby reduce wear between said first and second bushings and said shaft.

15. The laser system as recited in claim 14 further comprising a titanium sleeve which encases said magnet and is attached to said shaft to prevent the coolant in said casing cavity from contacting said magnet.

16. The laser system in accordance with claim 9 in which a plurality of magnets are attached to said shaft and encased in a titanium sleeve.

17. A method of pumping a liquid coolant to cool a laser, the method comprising the steps of:
 selecting a pump having a housing having a housing cavity therein and being connected to a casing having a casing cavity therein;
 mounting a rotatable shaft axially through said casing cavity and into said housing cavity;
 attaching an impeller to one end of said rotatable shaft within said housing cavity;
 attaching a permanent magnet onto said shaft within said casing cavity;
 encasing said permanent magnet with a sleeve;
 attaching a stator winding external to said casing cavity and in magnetic communication with said permanent magnet;
 providing a source of electric current;

passing said electric current through said stator winding to create a magnetic field to drive said magnet to rotate said shaft and said impeller;

providing a laser having a conduit through which a liquid coolant is adapted to flow; and pumping the liquid coolant through said laser conduit and through said housing when said impeller is rotated whereby a laser pump coolant cools the pump casing and stator windings.

18. The method as recited in claim 17 further comprising the step of constructing said housing, said shaft, said magnetic encasing sleeve and said impeller out of titanium.

19. The method as recited in claim 17 further comprising the steps of:

extending a conduit through the shaft from one end of the shaft to the other end thereof; and cooling said pump by circulating the coolant through said housing, into said conduit and then between said sleeve and said shaft when said impeller is rotated.

* * * * *